2,913,335

PROCESS FOR SEPARATING COBALT AND NICKEL FROM AMMONIACAL SOLUTIONS

John G. Dean, Wilton, Conn., assignor to the United States of America as represented by the Administrator of the General Services Administration No Drawing. Application May 21, 1958
Serial No. 736,936

1 Claim. (Cl. 75—108)

This invention relates to the separation of nickel and cobalt from an ammoniacal solution in which they are dissolved and more particularly to a process in which the cobalt is selectively precipitated from the solution to provide eventually a nickel compound containing so little cobalt as to be commercially acceptable to a greater extent than heretofore.

A prior art process is known wherein nickel is extracted from nickeliferous ores containing some cobalt by reducing such ores in a furnace, next leaching the calcined ores in an ammoniacal solution to extract the nickel and the cobalt, and finally distilling the decanted product liquor to cause the nickel and cobalt to precipitate as nickel and cobalt compounds. In theory, such compounds will precipitate sequentially from the product liquor during distillation if most of the cobalt is in either the cobaltous or cobaltic state and can be thereafter selectively filtered from the liquor. In actual practice, however, the two precipitates form practically simultaneously because of the presence in the product liquor of certain sulfur contaminants which tend so to affect the cobalt as to distribute it between the two states. It is therefore not commercially practical to separate the nickel and the cobalt by the known process so that after the intermixed nickel and cobalt compounds are calcined to form oxides of nickel and cobalt, the combined oxides, which are mainly nickel, are employed in industry whereever the amount of contained cobalt is not considered deleterious.

The foregoing inability to separate the cobalt from the nickel creates a number of disadvantages. Thus, if the amount of cobalt in the ore is so great that the finished oxides contain more than one part cobalt to one hundred parts nickel, the oxides have a considerably reduced market. To avoid this condition, it is customary to operate the process inefficiently in the leaching phase so as to limit the extraction of cobalt and thus produce a commercially acceptable product. However, this remedy has the effect of simultaneously lowering the amount of nickel eventually recovered leading to wastage of the nickel which ends up in the plant tailings heap.

The present invention contemplates the use of an additive to the ammoniacal product liquor which will definitely precipitate practically all of the cobalt from the liquor before the nickel, whereby the latter is recoverable in the form of a relatively pure compound. Additives which successfully meet this objective and which permit selective precipitation of the cobalt from the product liquor with very little coprecipitation of nickel are found among the insoluble solid sulfides such as nickel sulfide (NiS) and ferrous sulfide (FeS). Other insoluble solid precipitants which have been found to be successful are elemental sulfur and sulfided calcined nickeliferous ore.

In copending application Serial No. 736,935, filed May 21, 1958, it was disclosed that certain gaseous and water soluble sulfides are also effective for this purpose. As in the copending application, it was found that rapid mixing of the additive with the product liquor favors the more selective precipitation of the cobalt and that limited aeration of the product liquor during precipitation by the additive further enhances the selectivity of precipitation.

An object of the present invention is to provide a process whereby cobalt is precipitated selectively from an ammoniacal solution containing nickel and cobalt by treating such solution with an insoluble sulfide or sulfur bearing additive before distillation thereof.

Another object of the invention is the provision of a process whereby cobalt is precipitated selectively from an ammoniacal solution containing nickel and cobalt by treating such solution in the presence of air or oxygen with an insoluble sulfide or sulfur bearing additive before distillation thereof.

A further object of the invention is the provision of a process whereby cobalt is precipitated selectively from an ammoniacal solution containing nickel and cobalt by treating such solution in the presence of air or oxygen with an insoluble sulfide before distillation thereof.

Still another object is to provide a process whereby cobalt is precipitated selectively from an ammoniacal solution containing nickel and cobalt by treating such solution with either nickel sulfide, ferrous sulfide, elemental sulfur, or a sulfided calcined ore.

Other objects and many of the attendant advantages of this invention will be readily appreciated as the same becomes better understood by reference to the following detailed description.

The novel process disclosed herein is intended to be employed in conjunction with a well-known process for recovering nickel from nickeliferous ore containing cobalt and iron such as is found in Cuba in considerable quantities. The ore is dried to reduce substantially the moisture content, is ground to produce a finely divided mass, and is fed into the top of a vertical multiple hearth reduction furnace through which it passes downwardly at a slow rate. Undiluted producer gas is introduced at a low point in the furnace and combustion gases may be introduced at various higher levels which cause the ore to be preheated to a temperature of about 600° C. and then to be slowly heated in a reducing atmosphere to a final temperature between 700° C. and 850° C.

The calcined ore is cooled after it leaves the furnace and is eventually treated with an ammoniacal solution to leach out the nickel and cobalt. The ammoniacal solution is allowed to settle for a sufficient time to permit decantation of a product liquor containing a large percentage of the nickel in the ore and much of the cobalt. The product liquor is passed through a bubble tower countercurrent to a flow of steam which distills the ammonia and other dissolved gases from the product liquor thereby causing the nickel and cobalt to precipitate generally in the form of carbonates. These carbonates may then be calcined to form oxides which are commercially useful. As previously pointed out, the nickel and cobalt co-precipitate and provide a final product which has more limited use than would a nickel product having a smaller cobalt content.

The present invention departs from the foregoing process by treating the product liquor after decantation and prior to distillation with an insoluble solid sulfide such as nickel sulfide or ferrous sulfide, or with such an insoluble solid as elemental sulfur or calcined ore which is sulfided after it leaves the reduction furnace. These additives have the effect of causing the cobalt to precipitate immediately, and in advance of the nickel, as an insoluble sulfide which can be separated from the product liquor as by filtration. Very little of the nickel compounds will precipitate at this time. Thereafter, the clarified liquor can be subjected to distillation to remove ammonia and carbon dioxide which results in precipitation of nickel basic carbonate and sulfates, these precipitates being amenable to further treatment to produce a commercial nickel product relatively free of cobalt. In order to obtain the best results, the additives should be mixed rapidly throughout the product liquor as this will cause precipitation to take place simultaneously throughout the liquor. Furthermore, countercurrent flow of the sulfide additive with respect to the product liquor reduces the quantity of sulfides required. Treating the product liquor to reduce most of the cobalt to the cobaltous form before applying the sulfide additive also results in smaller requirements for the additive.

*Example 1*

In order to test the efficacy of each of the sulfide additives described above, several product liquors were analyzed to determine their nickel and cobalt contents. Varying amounts of each sulfide precipitant were then added to samples of the product liquors to cause precipitation of the cobalt. The precipitate was then filtered and analyzed to determine the percentage of the original amount of cobalt in the product liquor which was precipitated and also the percentage of the nickel originally in the product liquor which was co-precipitated with the cobalt. The parts of cobalt to one hundred parts of nickel in both the original product liquor and the filtrate were also computed to form a basis of comparison of the profound results produced by the sulfide additives. These results are tabulated in the following table:

| Liquor Composition | | | Precipitant | | Filtrate | Precipitate | |
|---|---|---|---|---|---|---|---|
| g. Ni/ 100 ml. | g. Co/ 100 ml. | Pts. Co/ 100 pts. Ni | g. Compound/ 100 ml. | | Pts. Co/ 100 pts. Ni | Percent Ni pptd. | Percent Co pptd. |
| 1.085 | .0251 | 2.31 | NiS | 0.25 | 2.10 | 0 | 0.8 |
| | | | | 0.50 | 0.96 | 0 | 51.4 |
| | | | | 1.0 | 0.24 | 0.4 | 89.4 |
| | | | | 2.0 | 0.12 | 11.2 | 95.3 |
| 1.086 | .0184 | 1.69 | FeS | 5 | 0.96 | 1.5 | 44.1 |
| | | | | 10 | 0.24 | 11.3 | 87.5 |

A study of this table indicates that in each instance the sulfide additive causes the selective precipitation of the cobalt in the product liquor with very little co-precipitation of the nickel so that the filtrate in each instance has fewer parts of cobalt to one hundred parts of nickel than did the product liquor which was treated. It can be seen that these additives have the ability to reduce the cobalt in the filtrate to below the desired commercial maximum of one part of cobalt to one hundred parts of nickel without the loss of an infeasible amount of nickel in the precipitate. It is also apparent from the results shown in the table that careful control of the amount of sulfide additive employed will produce a filtrate composed essentially of nickel having a commercially acceptable amount of cobalt therein and which is amenable to further treatment to produce compounds useful to industry.

*Example 2*

Having determined that certain of the insoluble solid sulfides have the ability to selectively precipitate cobalt from an ammoniacal solution containing cobalt and nickel, it becomes desirable to find the cheapest sulfided additive which will perform this function so as to reduce the cost of the final products. It has been found that if the calcined ore as it emerges from the reduction furnace is sulfided, as by passing hydrogen sulfide through the dry calcine or by forming a slurry of the calcine in water and thereafter bubbling hydrogen sulfide through the slurry, the sulfided calcine when mixed with an ammoniacal solution containing nickel and cobalt will selectively precipitate the cobalt from the solution.

A series of tests were run in which samples of the same product liquor were contacted for two hours with dry untreated calcine, with dry calcine sulfided with hydrogen sulfide, and with calcine in a slurry through which hydrogen sulfide was bubbled. In each case, the amount of nickel and cobalt remaining in the product liquor after treatment was determined as were the percentages of the nickel and cobalt which were precipitated. The parts cobalt to one hundred parts nickel remaining in solution were calculated thereafter for comparison with the product liquor before treatment. The results of these tests are shown in the following table:

| Treatment | Nickel | | Cobalt | | Pts. Co/ 100 Pts. Ni in solution |
|---|---|---|---|---|---|
| | g./100 ml. of solution | Percent pptd. | g./100 ml. of solution | Percent pptd. | |
| Product liquor (untreated) | 1.377 | | .0311 | | 2.26 |
| 100 g. calcine (untreated) | 1.588 | 0 | .0230 | 26.0 | 1.45 |
| Dry calcine+H₂S: | | | | | |
| 100 g. calcine | 1.384 | 0 | .00594 | 81.0 | 0.43 |
| 50 g | 1.341 | 2.6 | .00586 | 81.0 | 0.44 |
| 25 g | 1.348 | 2.1 | .00763 | 75.5 | 0.57 |
| Calcine in slurry+H₂S: | | | | | |
| 100 g. calcine | 1.244 | 9.7 | .00153 | 95.2 | 0.12 |
| 50 g | 1.324 | 3.9 | .0126 | 59.4 | 0.95 |
| 25 g | 1.369 | 0.6 | .0235 | 24.4 | 1.72 |

The foregoing table, in the right column, shows that the calcine when added to the product liquor has the ability to selectively precipitate the cobalt to an extent that the parts of cobalt to one hundred parts of nickel in the product liquor were reduced from 2.26 for the untreated product liquor to a considerably lower figure and in most instances below the desired commercially acceptable figure of one part cobalt to one hundred parts nickel.

It will be noted that even the untreated calcine will selectively precipitate cobalt. This is due to the fact that the calcine even though untreated is lightly sulfided by the hydrogen sulfide contained in both the producer and combustion gases supplied to the reduction furnace. It will be apparent from this that the calcine can be sulfided after it leaves the furnace by passing the producer gases over it thus making it unnecessary to obtain a commercial supply of hydrogen sulfide for this purpose.

It will also be noted that the product liquor leaches some of the nickel from the untreated calcine and from the dry sulfided calcine as will be apparent from the second column of the table wherein the product liquor after treatment with the calcine contains more nickel than it did before treatment. This, of course, is beneficial in that the cobalt to nickel ratio of the treated product liquor is further lowered.

It should be understood, of course, that the foregoing disclosure relates to only preferred embodiments of the invention and that numerous modifications and alterations may be made therein without departing from the spirit and scope of the invention as set forth in the appended claim.

What is claimed and desired to be protected by Letters Patent of the United States is:

In the recovery of nickel from a cobalt containing nickeliferous ore which has been calcined in a reducing atmosphere, the process of obtaining the nickel content of said calcined ore substantially free of cobalt which comprises sulfiding a portion of said calcined ore, leaching the remainder of said calcined ore in an ammoniacal solution, decanting a product liquor from said ammoniacal solution, mixing with said product liquor in the presence of oxygen said sulfided calcined ore to cause a substantial amount of the cobalt in the product liquor to precipitate selectively, and separating the precipitate from the product liquor.

References Cited in the file of this patent

UNITED STATES PATENTS

| | | |
|---|---|---|
| 2,722,480 | Roy | Nov. 1, 1955 |
| 2,755,172 | McGauley et al. | July 17, 1956 |